US011340241B2

(12) United States Patent
Sasaki et al.

(10) Patent No.: US 11,340,241 B2
(45) Date of Patent: May 24, 2022

(54) AUTOMATED ANALYZER

(71) Applicant: Hitachi High-Technologies Corporation, Tokyo (JP)

(72) Inventors: Shunsuke Sasaki, Tokyo (JP); Takenori Okusa, Tokyo (JP); Yoshihiro Yamashita, Tokyo (JP); Hiroki Fujita, Tokyo (JP); Kenta Imai, Tokyo (JP); Toshiharu Suzuki, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 315 days.

(21) Appl. No.: 16/477,219

(22) PCT Filed: Jan. 24, 2018

(86) PCT No.: PCT/JP2018/002081
§ 371 (c)(1),
(2) Date: Jul. 11, 2019

(87) PCT Pub. No.: WO2018/155049
PCT Pub. Date: Aug. 30, 2018

(65) Prior Publication Data
US 2019/0361041 A1     Nov. 28, 2019

(30) Foreign Application Priority Data
Feb. 22, 2017  (JP) .............. JP2017-030611

(51) Int. Cl.
*G01N 35/00* (2006.01)
*B01L 9/00* (2006.01)
*G01N 35/04* (2006.01)

(52) U.S. Cl.
CPC ........ *G01N 35/00584* (2013.01); *B01L 9/543* (2013.01); *G01N 35/04* (2013.01);
(Continued)

(58) Field of Classification Search
CPC ............. G01N 35/00584; G01N 35/04; G01N 2035/0443; G01N 2035/0444;
(Continued)

(56) References Cited

U.S. PATENT DOCUMENTS 7,360,984 B1   4/2008  Sugiyama et al.
2011/0150704 A1*  6/2011  Fritchie .................. B01L 3/523
                                                422/69
(Continued)

FOREIGN PATENT DOCUMENTS

JP    08-094630 A    4/1996
JP    2011-033425 A  2/2011
(Continued)

OTHER PUBLICATIONS

International Search Report of PCT/JP2018/002081 dated May 1, 2018.

*Primary Examiner* — Jill A Warden
*Assistant Examiner* — John McGuirk
(74) *Attorney, Agent, or Firm* — Mattingly & Malur, PC

(57) ABSTRACT

An automated analyzer capable of continuously performing supply of consumables is realized while continuing measurement is performed, by a simple and small amount of mechanism. An automated analyzer includes a unit that executes processing necessary for sample analysis; a consumable supply unit that supplies consumables necessary for the sample analysis to the unit; and a control device that controls operations of the unit and the consumable supply unit, in which the consumable supply unit includes a consumable container holding portion that holds a consumable storage container in which consumables is aligned and accommodated, a preliminary storage portion that temporarily holds the consumables taken out from the consumable storage container, and a transport mechanism that transports the consumables to the unit, and in which the control device
(Continued)

transports and stores at least a portion of the consumables taken out from the consumable storage container in the preliminary storage portion.

11 Claims, 16 Drawing Sheets

(52) U.S. Cl.
CPC ....... *B01L 2200/14* (2013.01); *B01L 2200/16* (2013.01); *B01L 2200/18* (2013.01); *B01L 2300/0663* (2013.01)

(58) Field of Classification Search
CPC ........... G01N 2035/0465; G01N 2035/00891; G01N 2035/0094; G01N 2035/0498; G01N 35/025; G01N 35/0063; G01N 35/00663; B01L 9/543; B01L 2200/14; B01L 2200/16; B01L 2200/18; B01L 2300/0663; G06Q 10/087
See application file for complete search history.

(56) References Cited

U.S. PATENT DOCUMENTS

| | | | | |
|---|---|---|---|---|
| 2012/0004770 | A1* | 1/2012 | Ooyen | G07F 11/00 700/235 |
| 2012/0269604 | A1 | 10/2012 | Baumann et al. | |
| 2013/0201019 | A1 | 8/2013 | Yamaguchi et al. | |
| 2013/0280130 | A1* | 10/2013 | Sarwar | G01N 35/1002 422/63 |
| 2017/0350912 | A1* | 12/2017 | Maetzler | G01N 35/04 |

FOREIGN PATENT DOCUMENTS

| | | |
|---|---|---|
| JP | 2012-026814 A | 2/2012 |
| JP | 2012-078264 A | 4/2012 |
| JP | 2012-225903 A | 11/2012 |
| WO | 01/69263 A1 | 9/2001 |

* cited by examiner

[Fig. 1]
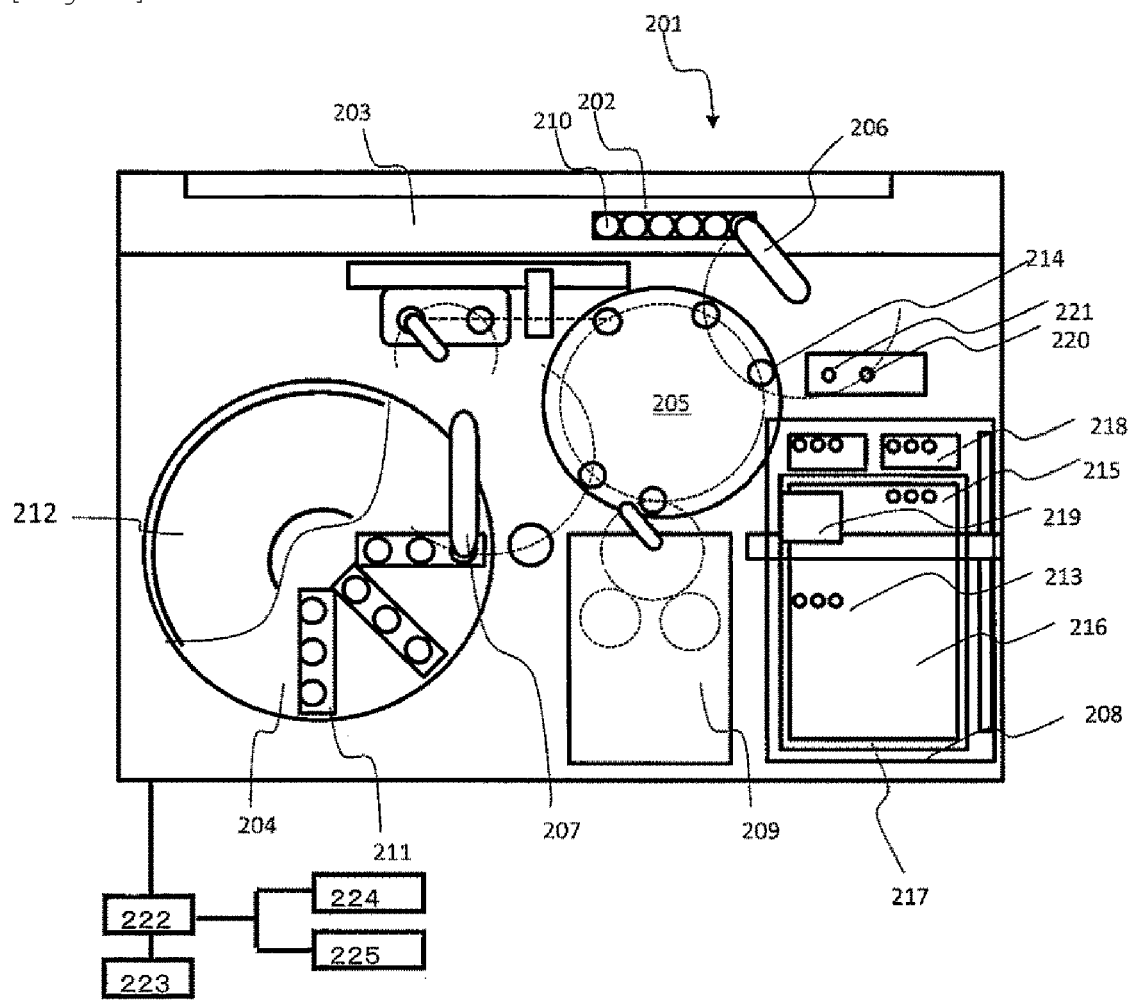

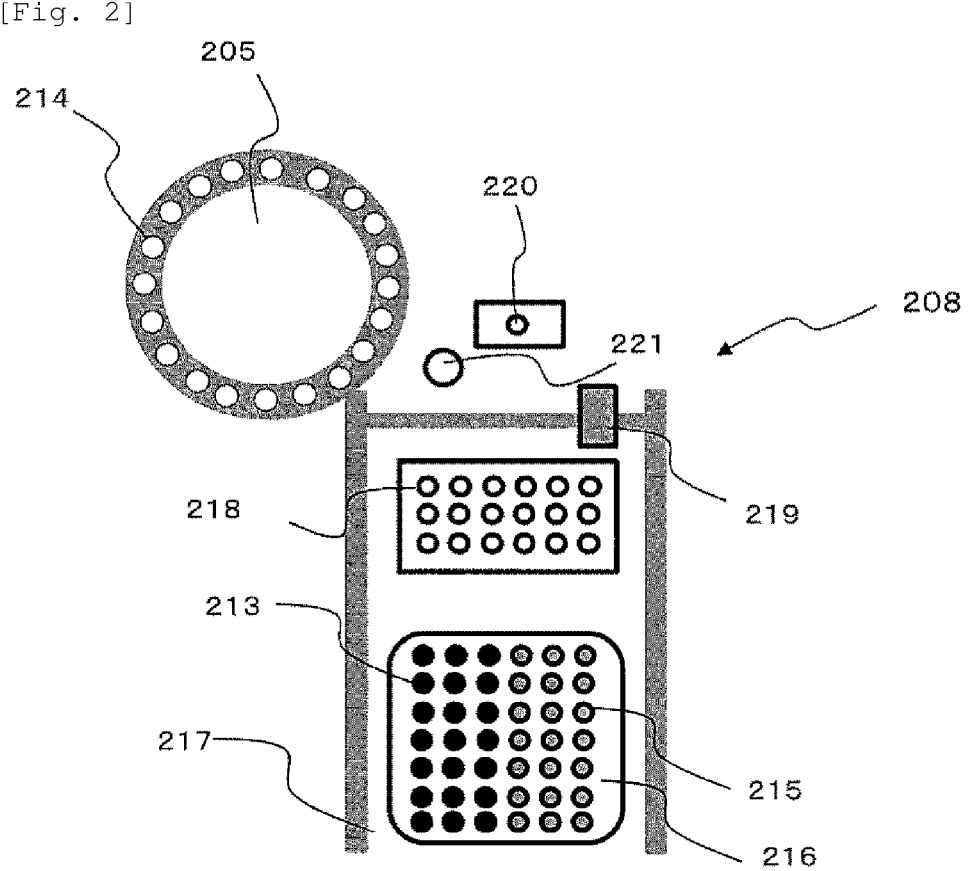
[Fig. 2]

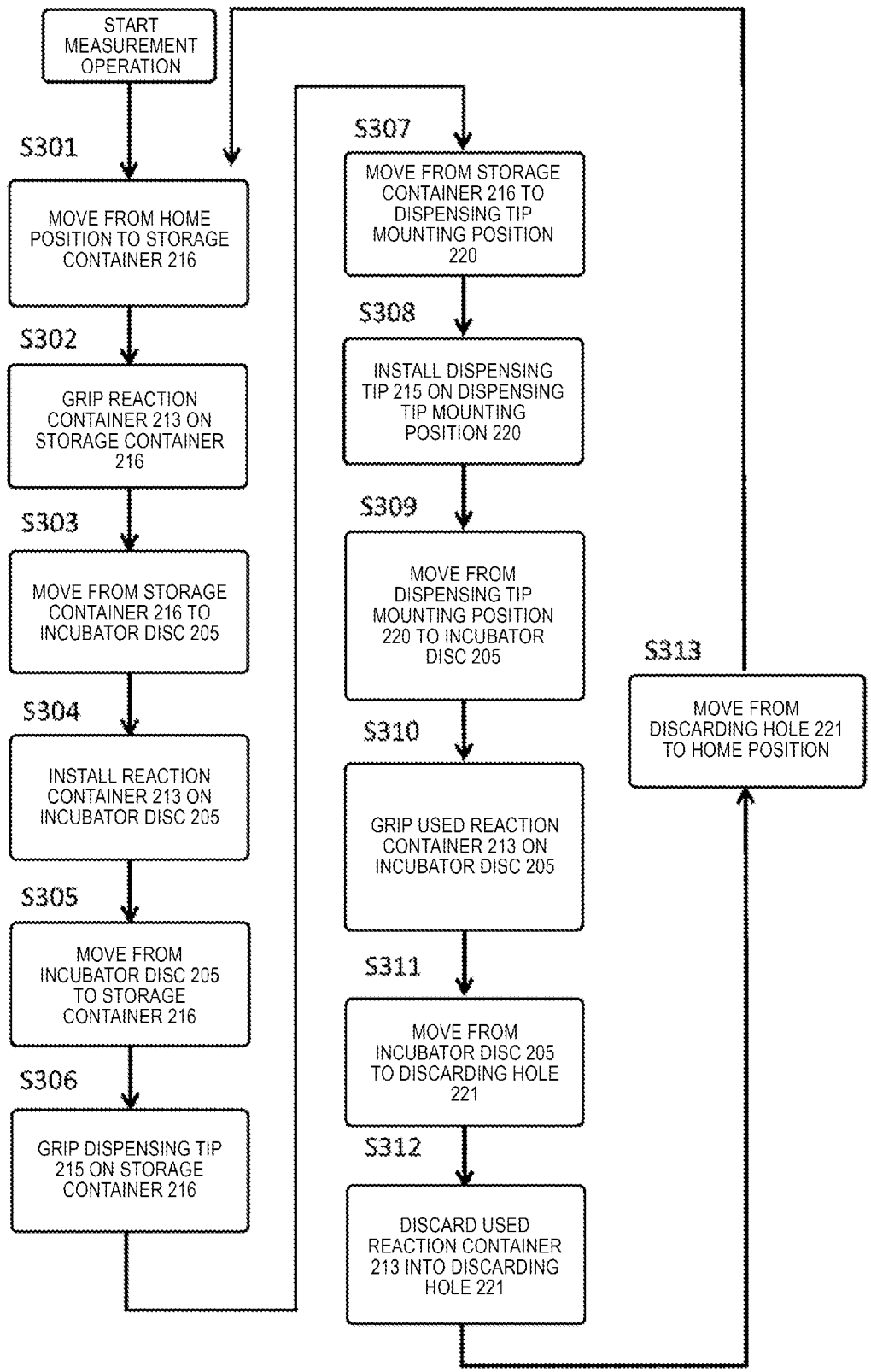

[Fig. 4-1]
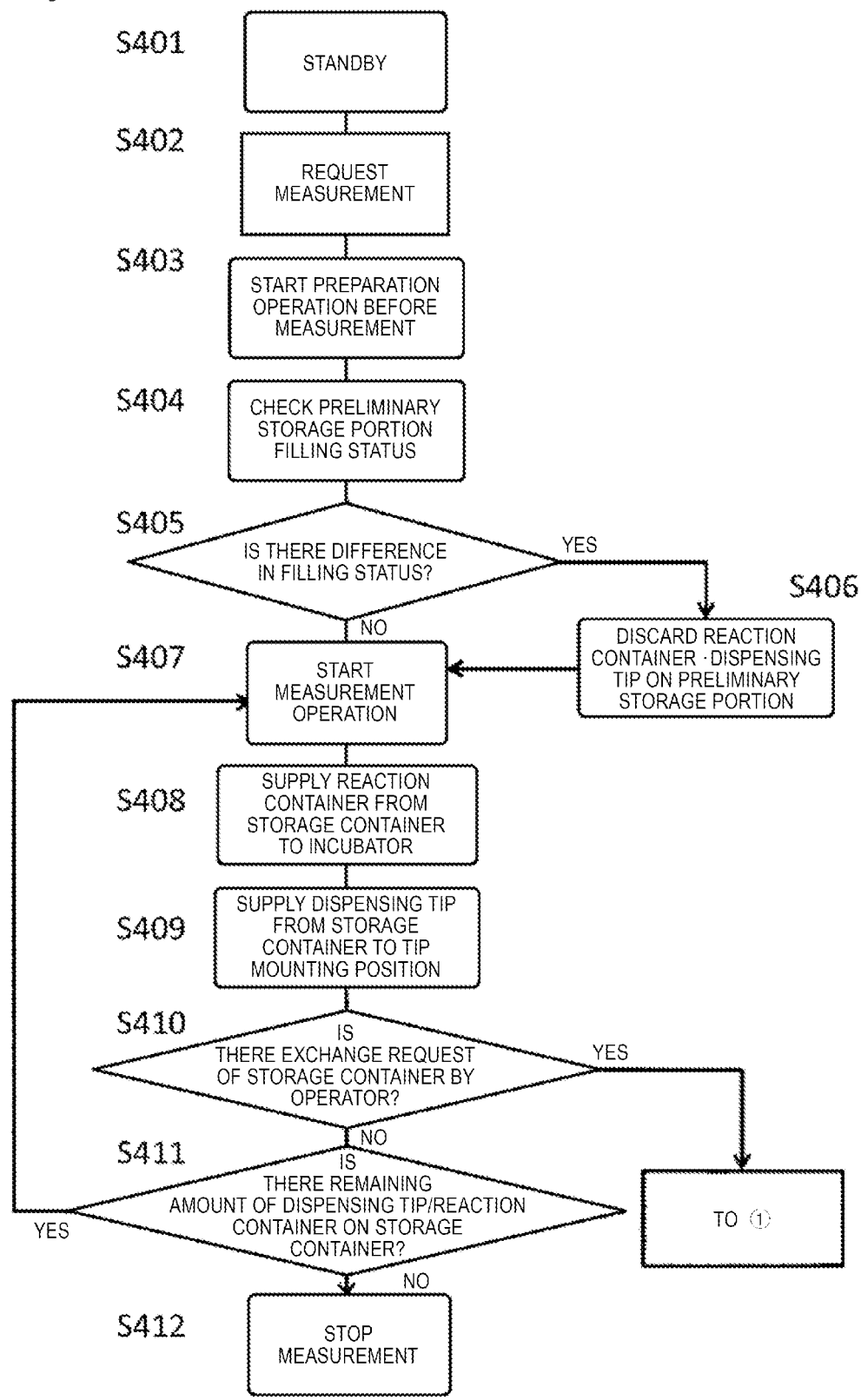

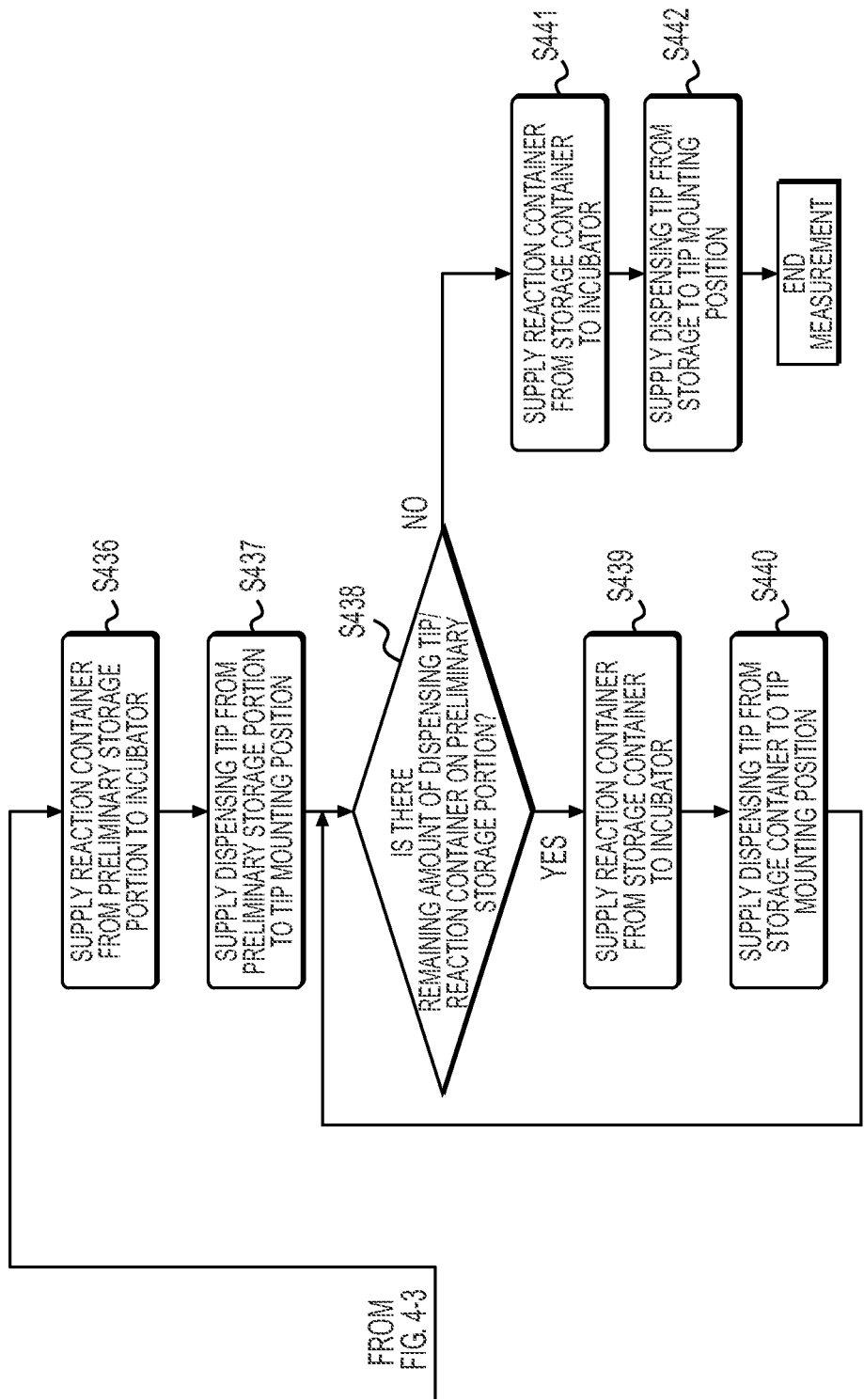
FIG. 4-3 (CONT. 1)

[Fig. 5]
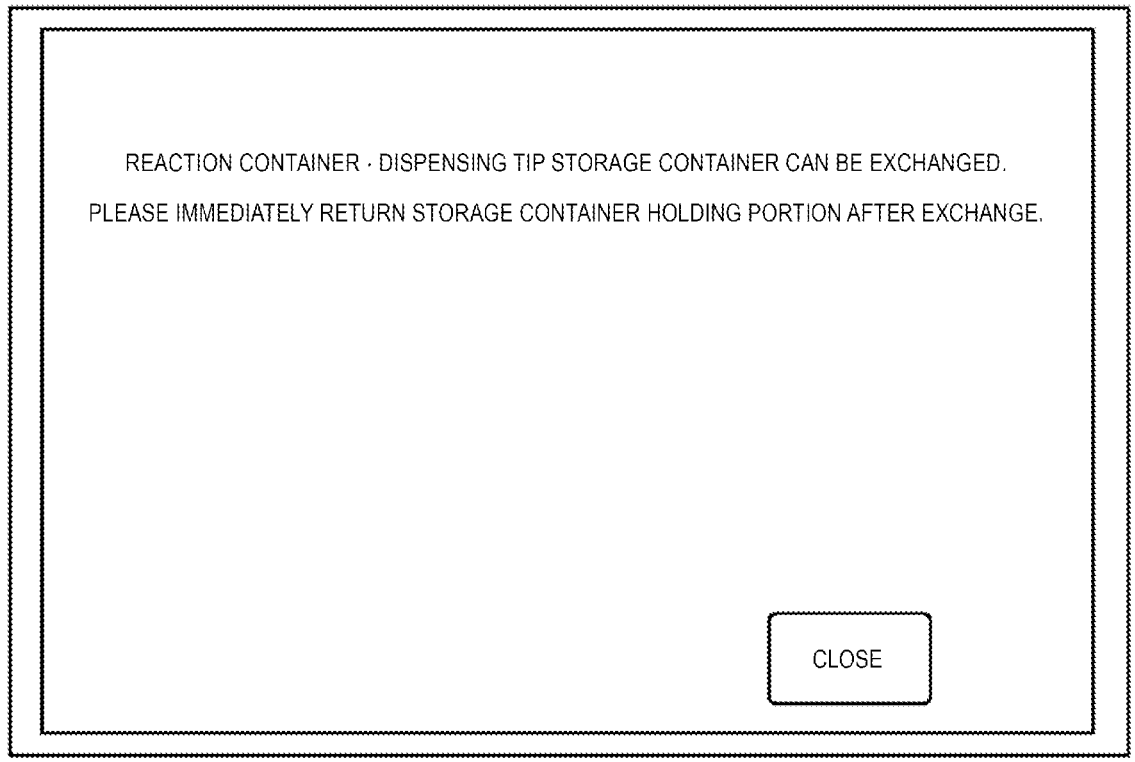

[Fig. 7]
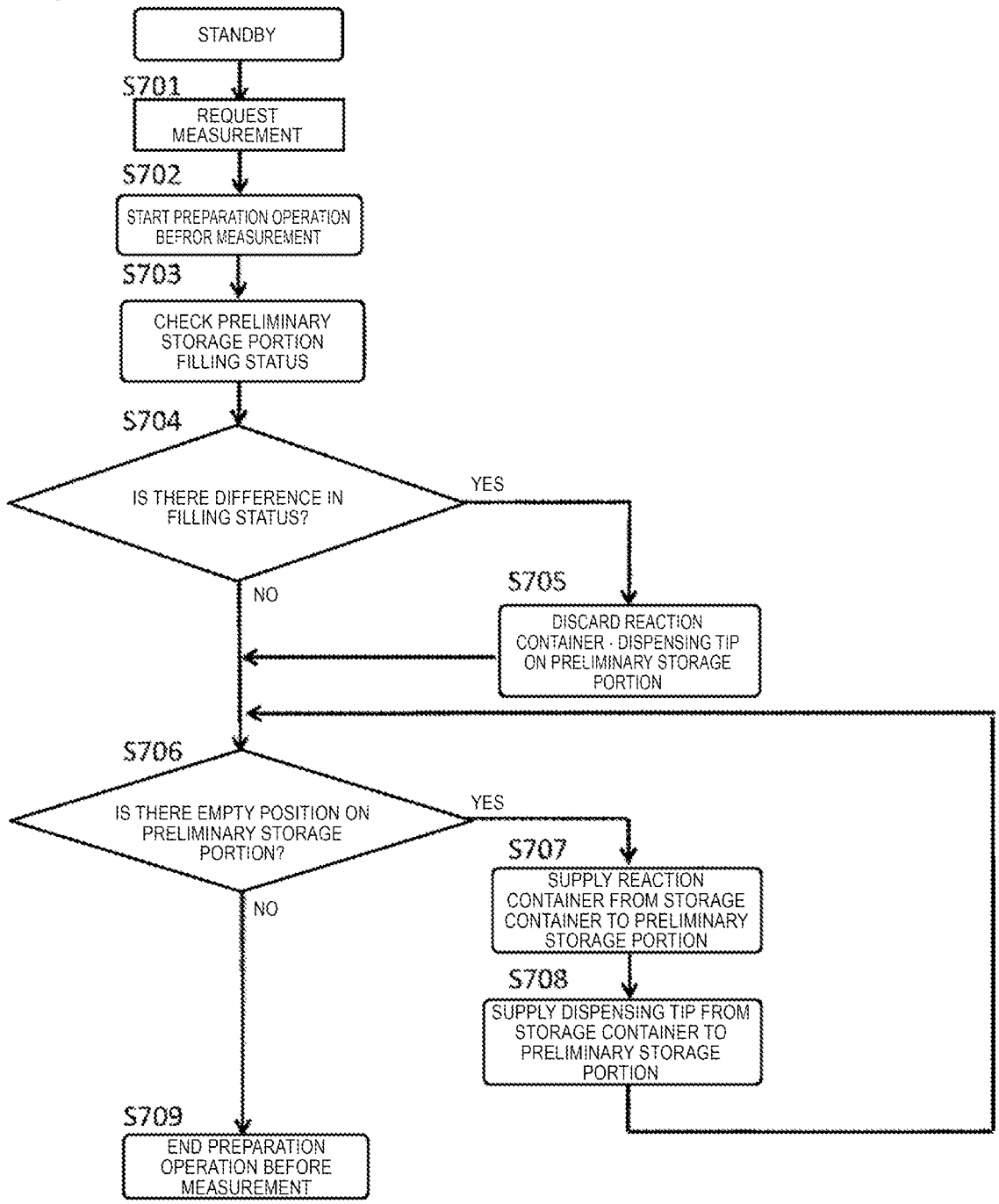

[Fig. 8]
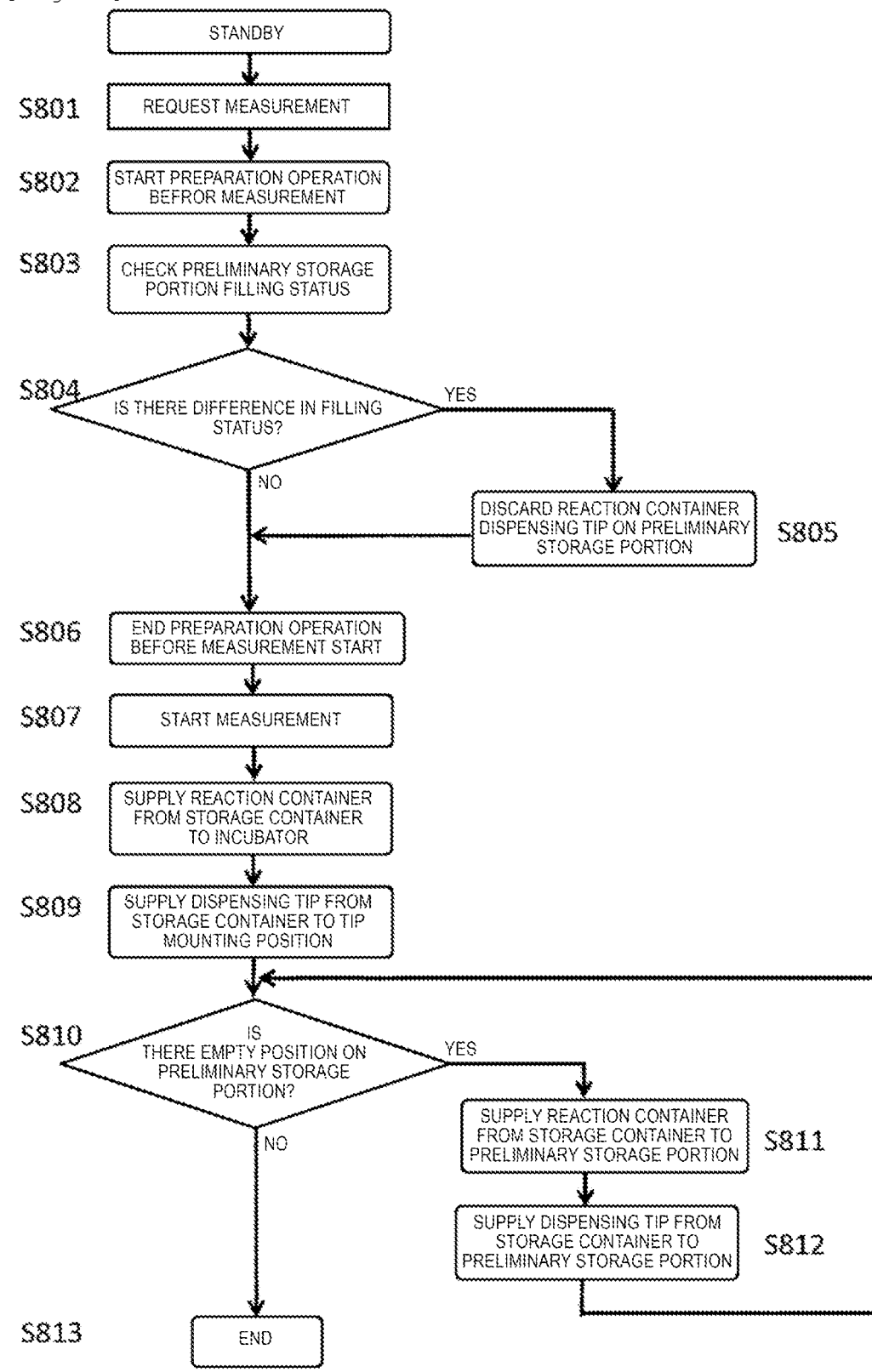

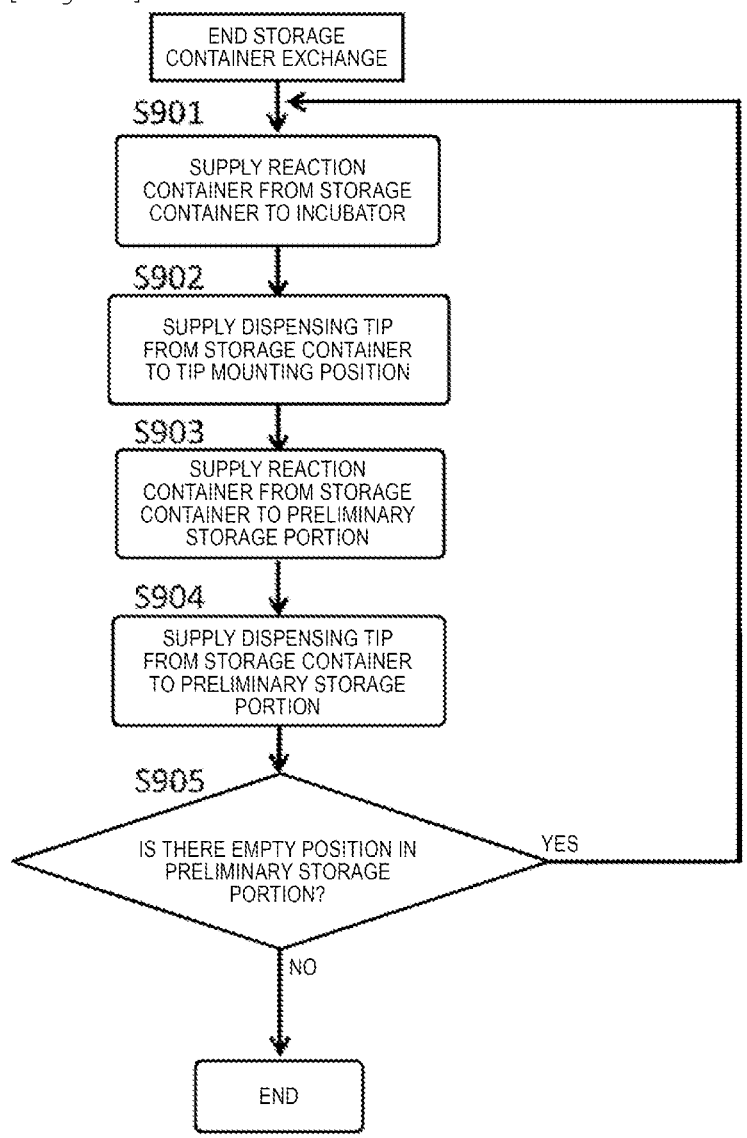

[Fig. 10]
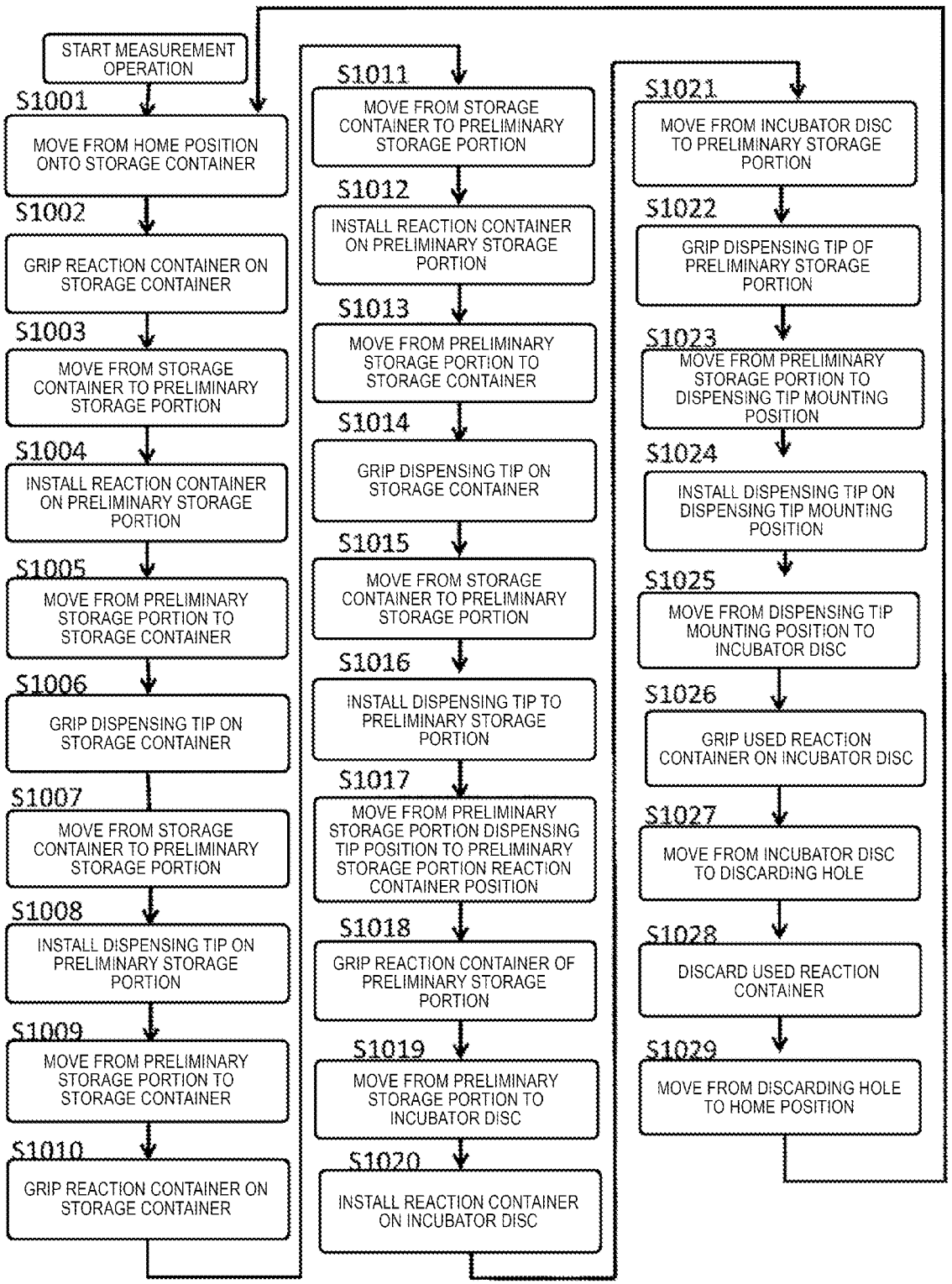

[Fig. 11-1]
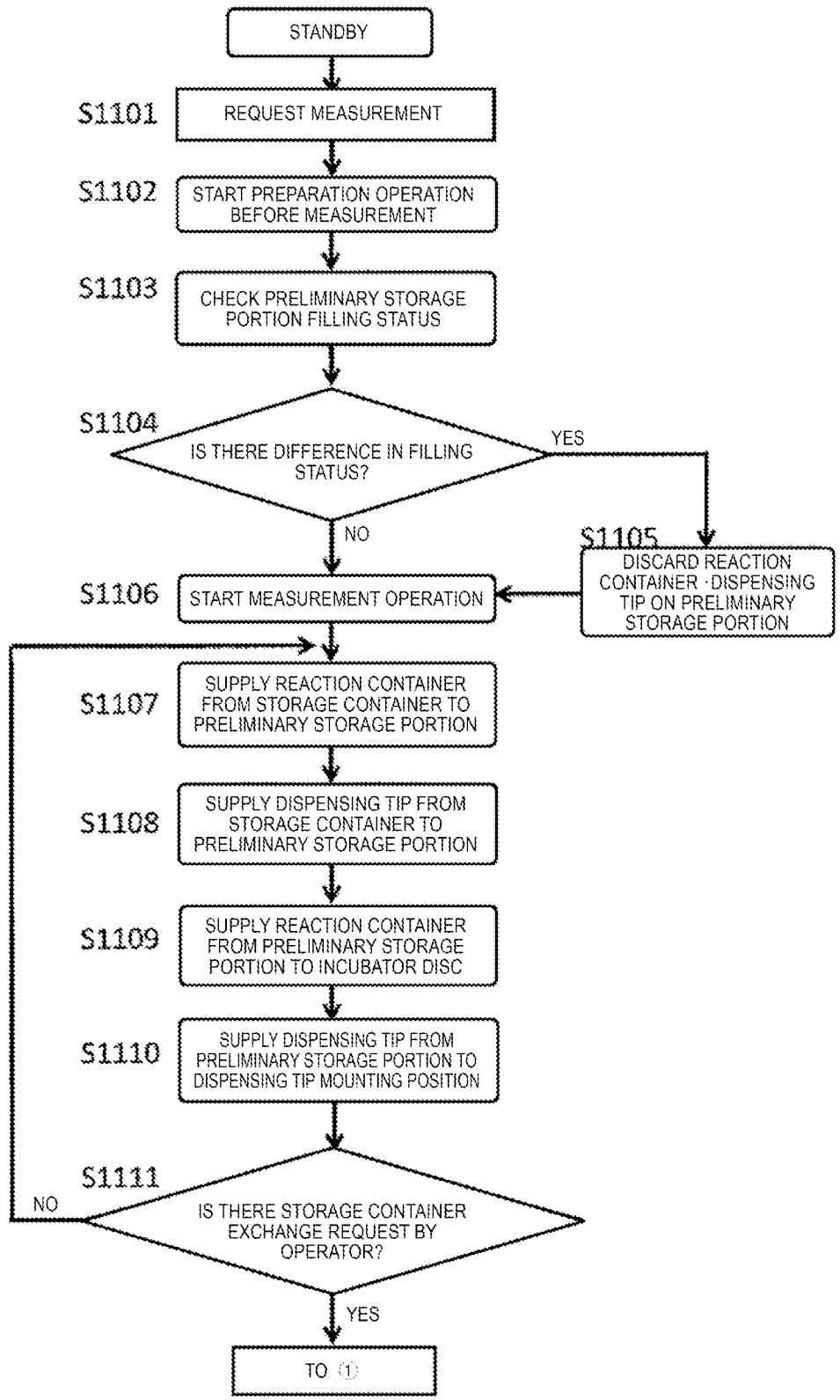

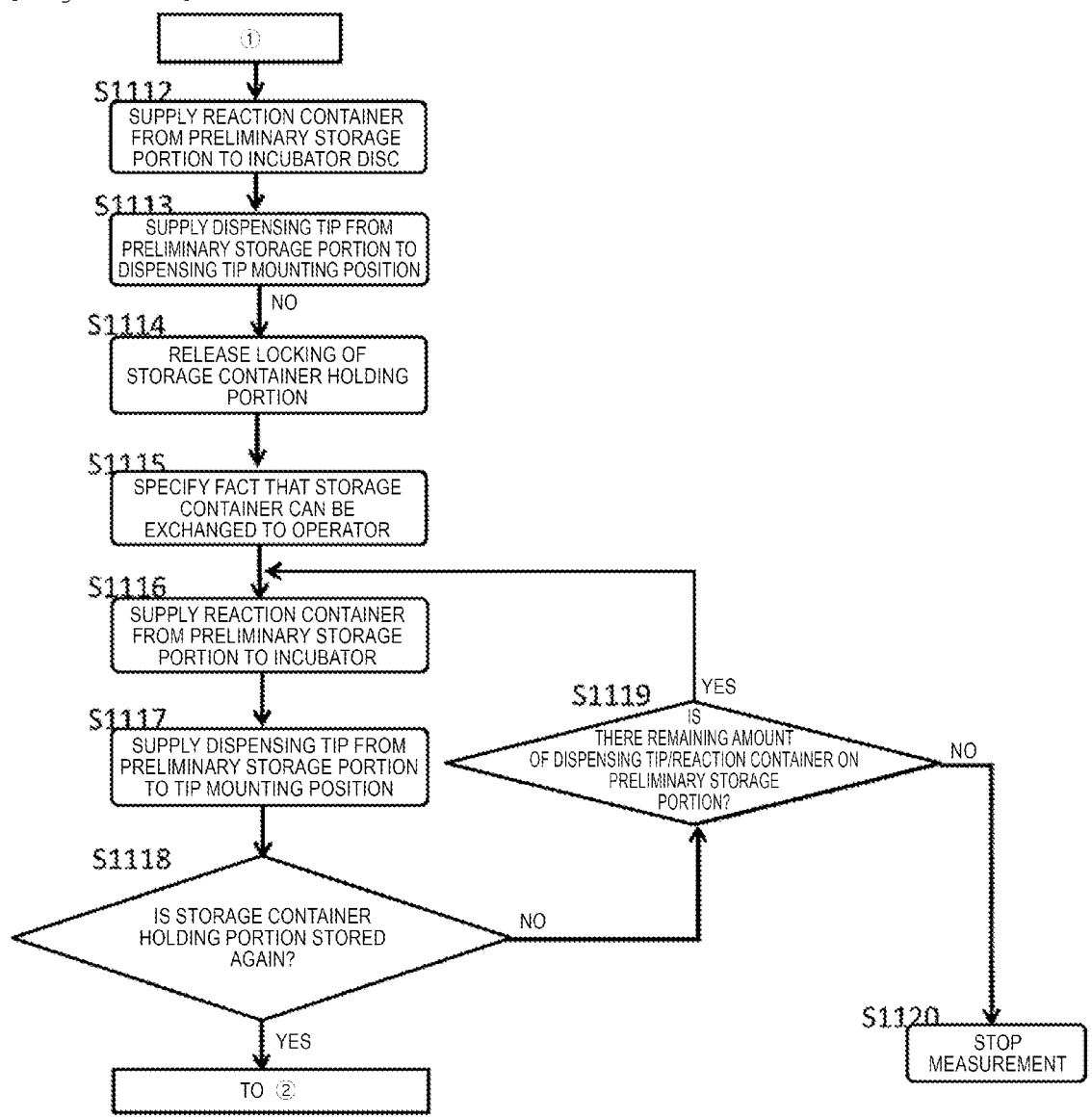

AUTOMATED ANALYZER

TECHNICAL FIELD

The present invention relates to an automated analyzer for analysis of organism-derived samples such as blood by use of consumables and to a supply method of the consumables.

BACKGROUND ART

Traditional automated analyzers include those which use dispensing tips and reaction vessels as disposable consumables. These consumables are supplied to the apparatus by a user. Subsequently, the consumables are delivered to predetermined regions by a transport mechanism of the apparatus. These consumables need be present in the apparatus in numbers equal to or larger than the number of requested measurements. A measurement work is suspended if the consumables run short. In order to prevent the suspension of the measurement work due to the consumable shortage, the apparatus must be adapted to allow the user to supply the consumables to the apparatus even during a measurement operation. However, in a case where the user and the transport mechanism access the same area to supply the consumables, the transport mechanism must be disabled for safety purposes while the user is performing the supply operation. Namely, the measurement work must be temporarily suspended. The recent years have seen an increasing demand for quick output of test results. This dictates the need to reduce risk of delay in the report of test results due to the consumable shortage.

Patent Literature 1 discloses an automated analyzer that operates as follows. Parts racks holding unused parts are moved up by a feeding elevator from the downmost position to a rack separation station A, where only the uppermost one of the parts racks stacked on top of each other is separated so as to be left on the rack separation station. The separated parts rack is transferred to a parts takeout station B where parts on the parts rack are taken out one after another by a movable grasper portion. After the use of a part, the used part is allowed to fall by opening a floor of the parts takeout station B and is collected on an elevator carriage of a collecting elevator.

CITATION LIST

Patent Literature

PTL 1: International Application Publication No. 01/069263

SUMMARY OF INVENTION

Technical Problem

According to a technique of the patent literature 1, the apparatus requires many complicated mechanisms such as the feeding elevator, the transport mechanism from the separation station to the takeout station and the collecting elevator, for replacement of a consumable storage container carrying reaction containers and dispensing tips. Further, these mechanisms vertically and horizontally occupy a large space in the automated analyzer. This results in a decreased freedom in design of internal mechanism layout in the automated analyzer limited in size.

It is an object of the invention to provide an automated analyzer which uses a few simple mechanisms to permit the user to supply the consumables even during the measurement work so as to reduce the risk of delay in the report of test results due to the consumable shortage.

Solution to Problem

According to an aspect of the invention for achieving the above object, an automated analyzer features the following configuration. The automated analyzer includes: a processing unit that performs processing necessary for sample analysis; a consumable supply unit that supplies the unit with consumables necessary for sample analysis; and a control device that controls the operations of the unit and the consumable supply unit, and has a configuration wherein the consumable supply unit includes: a consumable container holding portion for holding a consumable storage container where consumables are arranged and accommodated; a preliminary storage portion for temporarily storing the consumables taken out from the consumable storage container; and a transport mechanism for transporting the consumables to the processing unit, and wherein the control device makes at least some of the consumables taken out from the consumable storage container to be transported to and stored in the preliminary storage portion.

Advantageous Effects of Invention

According to the invention, the automated analyzer adapted to reduce the risk of delay in the report of test results due to the consumable shortage is provided.

BRIEF DESCRIPTION OF DRAWINGS

FIG. 1 is a schematic view illustrating an automated analyzer mounting a consumable supply method illustrated in the present patent.

FIG. 2 is a schematic view illustrating a consumable supply unit and a surrounding unit illustrated in the present patent.

FIG. 3 is a flow chart illustrating a typical operation of a transport mechanism during a measurement operation illustrated in Example 1.

FIG. 4-1 is a flow chart illustrating an operation of a consumable transport unit in a case where a user exchanges a consumable storage container during the measurement operation illustrated in Example 1.

FIG. 4-2 is a flow chart illustrating an operation of the consumable transport unit in a case where a user exchanges the consumable storage container during the measurement operation illustrated in Example 1.

FIG. 4-3 is a flow chart illustrating an operation of the consumable transport unit in a case where a user exchanges the consumable storage container during the measurement operation illustrated in Example 1.

FIG. 5 is view illustrating an example of a screen displaying on a display portion when a user can exchange the storage container.

FIG. 7 is a flow illustrating an operation in a case where the reaction container and the dispensing tip are supplied to the preliminary storage portion during a preparation operation before measurement start illustrated in Example 2.

FIG. 8 is a flow illustrating an operation in a case where the reaction container and the dispensing tip are supplied to the preliminary storage portion immediately after the measurement operation start illustrated in Example 2.

FIG. 9 is a flow illustrating an operation supplying the reaction container and the dispensing tip to the preliminary storage portion in a case where exchange of the storage container is performed by a user during the measurement operation illustrated in Example 2.

FIG. 10 is a flow illustrating a basic operation of the transport mechanism in a case where the reaction container and the dispensing tip are always supplied via the preliminary storage portion illustrated in Example 3.

FIG. 11-1 is a flow illustrating an operation of the consumable transport unit in a case where there is an exchange request of a consumable storage container by a user illustrated in Example 3.

FIG. 11-2 is a flow illustrating an operation of the consumable transport unit in a case where there is an exchange request of a consumable storage container by a user illustrated in Example 3.

FIG. 11-3 is a flow illustrating an operation of the consumable transport unit in a case where there is an exchange request of a consumable storage container by a user illustrated in Example 3.

DESCRIPTION OF EMBODIMENTS

Figures 2, 4:
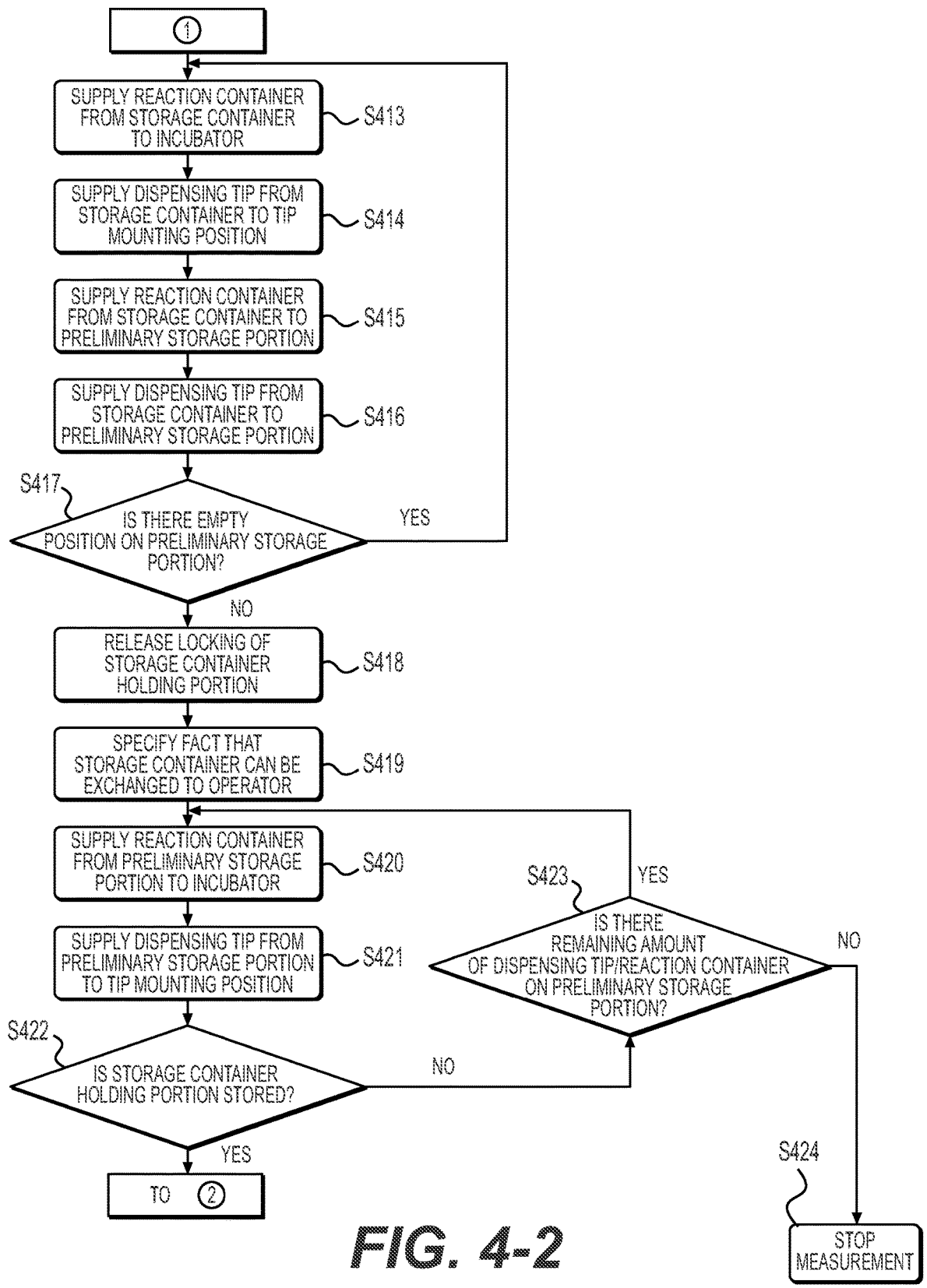

The embodiments of the invention will hereinbelow be described with reference to the accompanying drawings.

In this embodiment, an automated analyzer is described by way of example. The automated analyzer is exemplified by automated biochemical analyzer, automated immunology analyzer and the like. However, these are merely an exemplary representation of the invention. The invention is not limited to the embodiments to be described hereinlater but includes a wide variety of apparatuses which react samples with reagents and analyze the samples based on the reaction results. The invention includes, for example, mass spectroscope used for clinical examination, blood coagulation analyzer for measurement of blood coagulation time, and the like. The invention is also applicable to complex systems integrating the above apparatuses, the automated biochemical analyzer and the automated immunology analyzer as well as automated analytic system based on these techniques.

First Embodiment

FIG. 1 is a schematic configuration diagram of an automated analyzer 201 to which a consumables supply method according to a first embodiment hereof is applied.

Referring to FIG. 1, the automated analyzer 201 includes: a rack transport line 203 for transportation of a sample rack 202; a reagent cooling unit 204; an incubator disc (reaction disc) 205; a sample dispensing mechanism 206; a reagent dispensing mechanism 207; a consumable transport unit 208; and a detection portion unit 209. The above components may also be referred to as unit.

The sample rack 202 accommodates a plurality of sample containers 210 containing biological samples such as blood and urine. The rack with the sample containers 210 accommodated therein is transported on the rack transport line 203.

A plurality of reagent containers 211 containing therein a variety of reagents for use in sample analysis are stored and cooled in the reagent cooling unit 204 as a reagent container storage portion. At least a part of a top side of the reagent cooling unit 204 is covered with a reagent disc cover 212.

The incubator disc 205 includes: a reaction container disposition portion 214 where a plurality of reaction containers 213 for reaction of the sample and the reagent are disposed; and a temperature control mechanism for adjusting the temperature of the reaction container 213 to a desired level.

The sample dispensing mechanism 206 includes a rotary drive mechanism and a vertical drive mechanism. By means of these drive mechanisms, the sample dispensing mechanism is capable of dispensing the sample from the sample container 210 into the reaction container 213 accommodated in the incubator disc 205. Similarly, the reagent dispensing mechanism 207 also includes the rotary drive mechanism and the vertical drive mechanism. By means of these drive mechanisms, the reagent dispensing mechanism dispenses the reagent from the reagent container 211 into the reaction container 213 accommodated in the incubator disc 205. The detection portion unit 209 includes a photomultiplier tube and a light source lamp, a spectroscope and a photodiode and is equipped with a function to control the temperature of these devices. The detection portion unit analyzes reaction solution.

Next, the details of the consumable transport unit 208 of the automated analyzer 201 are described with reference to FIG. 2.

The consumable transport unit 208 includes: a storage container holding portion 217 for holding a consumable storage container 216 storing a plurality of consumables for use in sample analysis such as reaction containers and dispensing tips; a preliminary storage portion 218 for temporarily storing these consumables; and a transport mechanism 219 for grasping and transporting the consumable item. The consumable transport unit has a function to transport the reaction container 213 or a dispensing tip 215 on the consumable storage container 216 or the preliminary storage portion 218 to a predetermined place by means of the transport mechanism 219.

The consumable container 216 is also referred to as a magazine and is formed with a plurality of recesses or holes in an upper side thereof. The consumable container with the consumables received in the recesses or holes in one-on-one basis is supplied to an operator. Since these consumables are disposable, the operator needs to supply the consumable container 216 to the automated analyzer at regular intervals and to discharge the consumable container 216, which is emptied of all the consumables, from the apparatus.

The transport mechanism 219 is movable on rails laid in x-axis, y-axis and z-axis directions (not shown), transporting the reaction container 213 stored in the consumable storage container 216 or the preliminary storage portion 218 to the incubator disc 205 or transporting the dispensing tip 215 to a tip mounting position 220. Further, the transport mechanism discards a used reaction container 218 on the incubator disc 205 in a discarding hole 221. The transport mechanism 219 also transports an unused reaction container 213 or dispensing tip 215 on the consumable storage container 216 to the preliminary storage portion 210 or transports the reaction container 213 or the dispensing tip 215 on the preliminary storage portion 210 to the incubator disc 207 or the tip mounting position 220. Therefore, the transport mechanism 219 has an arm structure for grasping the reaction container or the dispensing tip.

The preliminary storage portion 218 holds the reaction containers 213 and the dispensing tips 215 in the same manner as the consumable storage container 216. The transport mechanism 219 is capable of setting the reaction container 213 or the dispensing tip 215 on the preliminary storage portion 218 and of transferring the reaction container 213 or the dispensing tip 215 retained on the preliminary storage portion 218 to the incubator disc 205 or the dispensing tip supply position 220.

Independently from the other mechanism portions, the storage container holding portion 217 can be drawn out to a front side, a rear side or a lateral side of the apparatus. As not accessed by the other mechanisms, the storage container holding portion permits the user to replace the consumable storage container 216. It is noted that the storage container holding portion 217 may be provided with a door or cover such that the operator can access the consumable storage container by opening the door or cover. Alternatively, the storage container holding portion 217 may be provided with a lock mechanism which inhibits the storage container holding portion from being drawn out when the consumable storage container 216 is accessed by a mechanism such as the transport mechanism 219. Further, the storage container holding portion 217 may be provided with a sensor for detecting whether or not the consumable storage container 216 is set in position so that whether or not the consumable storage container 216 is replaced when the storage container holding portion 217 is drawn out can be detected.

In the automated analyzer 201, the above-described rack transport line 202, reagent container disc 204, incubator disc 205, sample dispensing mechanism 206, reagent dispensing mechanism 207, consumable transport unit 208, detection portion unit 209 and the like are referred to as an analytic operation portion.

In addition to the above-described analytic operation portion, the automated analyzer 201 further includes a controller (control portion) 222 for controlling the operations of the whole automated analyzer 201 and an operation portion 223. The control portion 222 is essentially composed of a hardware board, for example, and connected to a control device 224 such as computer and a storage device 225 such as hard disc. The operation portion 223 is essentially composed of a display portion such as display and an input device such as mouse and keyboard. The storage device 225 stores temperature ranges in correspondence to the respective units, for example. The control portion 222 and the control device 224 may each be configured by a dedicated circuit board as a hardware or otherwise, configured by a software implemented by a computer connected to the automated analyzer 201. In the case where the control portion or device is configured by the hardware, the control portion or device can be implemented by integrating a plurality of computing elements performing processes on a wiring board, on a semiconductor chip or in a package. In the case where the control portion or device is configured by the software, the control portion or device can be implemented by installing a high-speed general-purpose CPU in a computer which runs a program to execute a desired arithmetic processing. It is also possible to upgrade the existing apparatus by use of a recording medium storing this program. These devices, circuits, and the computer are interconnected via a wired network or wireless network through which data is transmitted or received as needed.

Figures 3, 4:
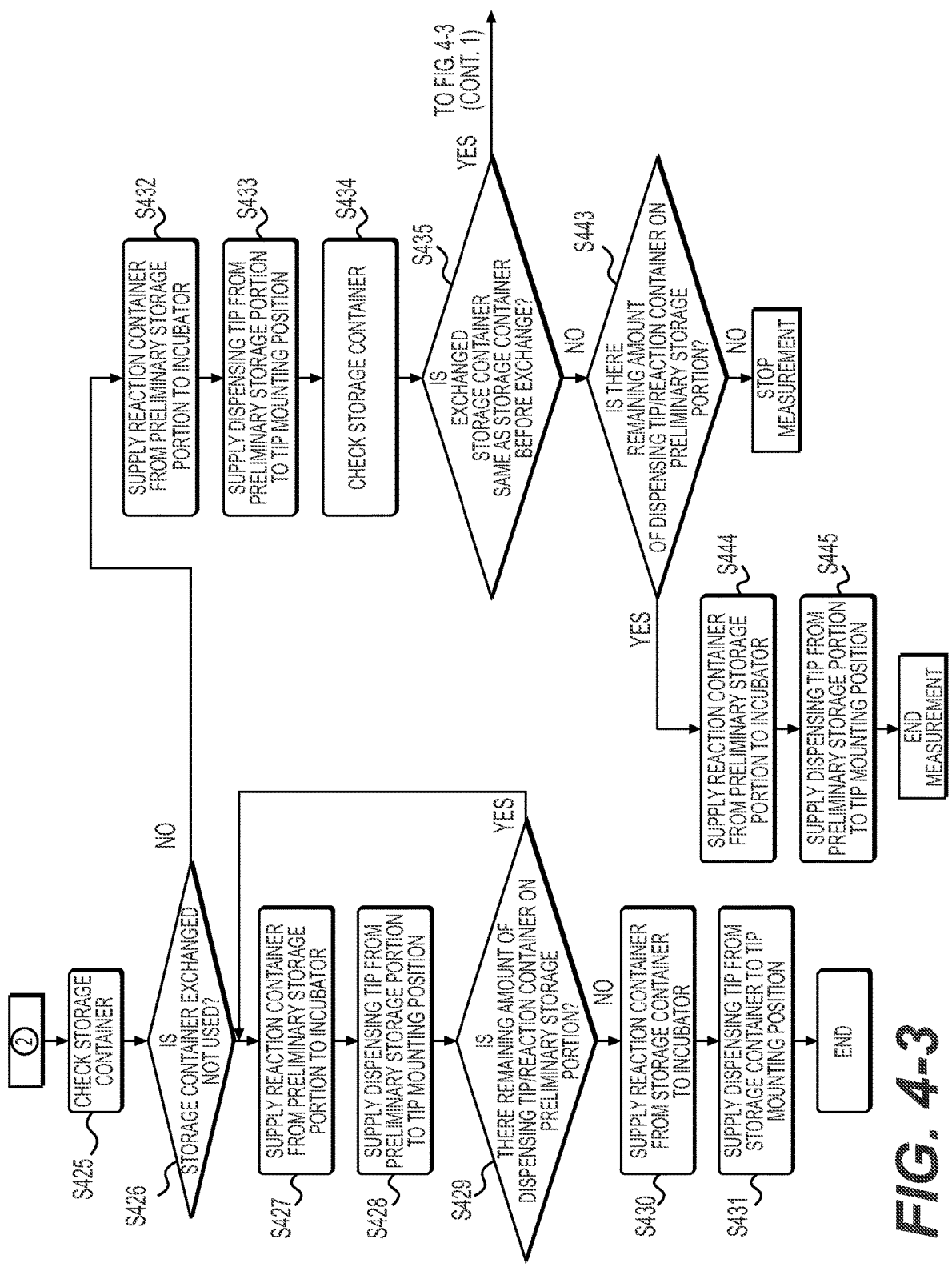

FIG. 3 shows a normal operation flow chart of the transport mechanism 219 during the measurement operation.

After the measurement work is started, the transport mechanism 219 is horizontally moved from a home position to place above the consumable storage container 216 (S301). Next, the transport mechanism is lowered to an arbitrary position on the consumable storage container 216 and grasps a reaction container set in place by means of an arm thereof (S302). Then, the transport mechanism is moved up. Subsequently, the transport mechanism is horizontally moved to a reaction container setting position on the incubator disc 205 (S303) and sets the transported reaction container at the relevant position (S304).

Next, the transport mechanism 219 is horizontally moved again to place above the consumable storage container 216 (S305) where the transport mechanism is lowered to an arbitrary position so as to grasp a set dispensing tip (S306) and then is moved up. The extracted dispensing tip is transported by the transport mechanism 219 to the tip mounting position 220 (S307) so as to be mounted to the relevant position (S308).

Subsequently, the transport mechanism 219 is moved to a used reaction container disposal position on the incubator disc so as to grasp a used reaction container (S310). The transport mechanism transfers the used reaction container from the incubator disc 205 to the discarding hole 221 (S311) so as to discard the used reaction container in the discarding hole 221 (S312). Finishing these operation steps, the transport mechanism 219 returns from the discarding hole 221 to the home position (S313).

Next, an operation flow chart of the consumable transport unit 208 in a case where the user replaces the consumable storage container 216 during the measurement operations is shown in FIG. 4-1 to FIG. 4-3.

FIG. 4-1 is an operation flow chart showing steps from a standby state to a request for replacement of the consumable storage container 216 made by the operator.

When the automated analyzer in a standby mode (S401) receives a measurement request (S402), the apparatus starts a measurement preparation operation (S403). During the premeasurement preparation operation, the apparatus performs reset operations of the individual mechanism portions and operations of changing system water in the syringes and the flow paths connected to the sample dispensing mechanism 206 and the and reagent dispensing mechanism 207. In this process, the consumable transport unit 208 checks for a loaded state of the preliminary storage portion 218 (S404). To check the loaded state, the transport mechanism 219 is used for determining if the consumables such as the reaction container 213 and the dispensing tip 215 are loaded on the preliminary storage portion 218. Specifically, the transport mechanism 219 performs a grasping operation at each of the positions where the reaction container 213 or the dispensing tip 215 is retained on the preliminary storage portion 218 and determines that the reaction container or the dispensing tip is loaded (loaded state) if the mechanism can actually grasp the relevant consumable item or determines that the relevant position is vacant if the mechanism cannot grasp the consumable item. This operation may be performed at all the positions on the preliminary storage portion 218 or otherwise, performed only at plural predetermined positions. Instead of the grasping operation by the transport mechanism 219, a camera may be installed at place above the preliminary storage portion 218 so as to determine the presence or absence of the consumable item based on image analysis. Alternatively, a distance measuring device such as a laser displacement meter may be mounted to the transport mechanism 219 so as to determine the presence or absence of the consumable item based on the measurement of distance between the transport mechanism 219 and the preliminary storage portion 218.

The control portion 222 determines whether or not a loaded state of the preliminary storage portion 218 differs from the previous loaded state stored in the storage device (S405). The storage device 225 stores a loaded state of the preliminary storage portion 218 at the completion of the previous measurement work. The control portion compares the loaded state stored in the storage device 225 and the loaded state determined by the transport mechanism 219. If the loaded states match each other, the control portion terminates the premeasurement preparation operation of the consumable transport unit 208.

On the other hand, if the loaded states do not match, the control portion determines that some manipulation has been done on the dispensing tip or the reaction container in the preliminary storage portion 218 and discards all the consumables retained on the preliminary storage portion 218 (S406). This is because the manipulation of the consumable item by the user involves possibility that the reaction container 213 may be damaged so that the transport mechanism 219 may fail to grasp the reaction container, or that a distal end of the dispensing tip 215 may be closed, resulting in failure to dispense sample correctly.

When the premeasurement preparation operations of the consumable transport unit 208 and the other units are completed, the automated analyzer 201 starts the measurement operation (S407). During the measurement operation, the consumable transport unit 208 repeatedly performs the normal operation flow chart shown in FIG. 3 (S408 to S411). In each apparatus operation cycle, the control portion 222 responds to the user pressing a fixed button on the operation portion 223 or the apparatus by checking whether a request for replacing the consumable storage container 216 is made or not (S410).

If the request is not made, the control portion 222 checks the number of remaining consumables on the consumable storage container (S411). If consumables for the next operation cycle is available, the control portion returns to the step S407 to repeat the operations from the step S408. If it is determined in the step S411 that no consumable item remains on the consumable storage container, the control portion stops the supply of the reaction container and the dispensing tip and suspends a new measurement cycle (S412).

When the control portion receives the replacement request from the user in the step S410, the control portion proceeds to a flow chart of FIG. 4-2.

According to FIG. 4-2, the transport mechanism 219 transports the reaction container 213 and the dispensing tip 215 from the consumable storage container 216 to the preliminary storage portion 218 (S415, S416) while performing the normal operation flow (S413, S414). Specifically, the transport mechanism 219 transports the reaction container 213 and the dispensing tip 215 from the consumable storage container 216 to the incubator disc 205 and to the dispensing tip mounting position 220 at predetermined timing A in the same apparatus operation cycle (S413, S414). Further, the transport mechanism 219 transports the reaction container 213 and the dispensing tip 215 from the consumable storage container 216 to the preliminary storage portion 218 at timing B when the operations of steps S413 and S414 are not performed (S415, S416). Incidentally, in a case where the transport mechanism is not scheduled to transport the consumables from the consumable storage container 216 to the incubator disc 205 and the dispensing tip mounting position 220 at the timing A, the transport mechanism performs the operations S45 and S416 even at the timing A.

The operations of the steps S413 to S416 are performed in the same apparatus operation cycle. In each apparatus operation cycle, the control portion 222 checks for the loaded state of the preliminary storage portion 218 (S417) and repeats the operations of the steps S413 to S417 till the reaction containers 213 and the dispensing tips 215 are loaded on the preliminary storage portion 218.

When a predetermined amount of the reaction containers 213 and the dispensing tips 215 is transported to the preliminary storage portion 218, the transport mechanism 219 changes a supply source of the reaction container 213 and the dispensing tip 215 to the incubator disc 205 and the dispensing tip mounting position 220 from the consumable storage container 216 to the preliminary storage portion 218. When the supply source is changed, the control portion 222 unlocks the storage container holding portion 217 so as to enable the replacement of the consumable storage container by the operator (S418). Further, the control portion informs the operator that the replacement of the consumable storage container 216 is enabled (S419). The information may be outputted as a message on the screen as shown in FIG. 5. Alternatively, the information may also be given by way of an alarm sound, LED light or rotating red light.

When the information is outputted to the operator, the transport mechanism 219 starts to supply the consumables from the preliminary storage portion 218 (S420, S421).

The control portion 222 monitors the storage container holding portion 217 and determines in each apparatus operation cycle whether or not the replacement of the consumable storage container is performed by the operator. The replacement operation can be done using any of a variety of known methods. In a case where the storage container holding portion 217 has an infundibulum structure, for example, the control portion determines by monitoring with a sensor whether the infundibulum is drawn out or not. In a case where the storage container holding portion 217 is closed with a door, the control portion may also determine by monitoring whether the door is closed or not. Further, the control portion may also determine based on a replacement end signal sent from the user manipulating the operation portion 223 or the fixed button. Detecting by any of the methods that the operator has replaced the consumable storage container, the control portion proceeds to an operation flow chart of FIG. 4-3 to perform an operation of checking a consumable storage container 216 replaced anew.

On the other hand, if it is not detected in a step S422 that a consumable storage container is not stored in the storage container holding portion 217, the control portion determines the numbers of remaining reaction containers 213 and dispensing tips 215 on the preliminary storage portion 218 (S423). If some consumables remain, the control portion repeats the operations of the steps S420 to S422. If there remains no consumable item, a new measurement cycle is suspended (S424).

In FIG. 4-3, the transport mechanism 219 checks whether a consumable storage container 216 supplied anew is unused or not (S426). In the step S426, the transport mechanism 219 determines whether the consumable storage container 216 is unused or not by performing the grasping operation on the reaction container 213 and the dispensing tip 215 at the plural predetermined positions. Alternatively, a camera may be disposed at place above the consumable storage container 216 so as to determine the presence or absence of the consumable item based on the image analysis. Alternatively, the distance measuring device such as a laser displacement meter may be mounted to the transport mechanism 219 so as to determine the presence or absence of the consumable item based on the measurement of distance between the transport mechanism 219 and the consumable storage container 216.

It is noted that the step S426 is performed at a vacant time in the apparatus operation cycle. The step S426 is performed in parallel to the consumable supply from the preliminary storage portion 218 to the incubator disc 205 or the dispensing tip mounting position 220 in steps S427 and S428 or in steps S432 and S433. Therefore, the measurement operation is not interrupted by the operation of the step S426.

If the consumable storage container 216 replaced in the step S426 is determined as unused, the reaction container and the dispensing tip on the preliminary storage portion 218 are supplied (S427, S428). The transport mechanism checks whether all the reaction containers and the dispensing tips on the preliminary storage portion 218 are consumed (S429). If it is determined that the preliminary storage portion 218 is emptied, the reaction container 213 and the dispensing tip 215 are supplied to the incubator disc 205 and the dispensing tip mounting position 220 from a newly supplied consumable storage container 216 (S430, S431).

On the other hand, if the consumable storage container replaced in the step S426 is not determined as unused (namely, at least a part of the consumable storage container is determined as used), the consumables on the preliminary storage portion 218 continue to be used (S432, S433). The transport mechanism 219 checks again the replaced consumable storage container 216 (S434). At this time, the transport mechanism 219 performs the grasping operation at positions different from the positions on the consumable storage container 216 where the check operation in the step S426 was performed. The transport mechanism checks whether the replaced consumable storage container is a consumable storage container 216 used before the replacement operation was performed on the storage container holding portion 217, or a consumable storage container 216 already used, having vacant positions (S435). At this time, the check result obtained in the step S426 may be used.

If the set consumable storage container 216 is determined as the consumable storage container 216 used before the replacement operation was performed on the storage container holding portion 217, the measurement work is continued till the consumables on the preliminary storage portion 218 are consumed (S436, S438). If all the consumables are consumed, the supply source is changed from the preliminary storage portion 218 to the consumable storage container 216 so as to continue supplying the consumables to the incubator disc 205 and the dispensing tip mounting position 220 (S441, S442).

On the other hand, if it is determined in the step S435 that the used consumable storage container is loaded, the number of remaining consumables on the preliminary storage portion 218 is determined (S443) and if some consumables remain, the consumables are supplied from the preliminary storage portion 218 (S444, S445). On the other hand, if it is determined that no consumable item remains, a new measurement work is suspended.

Next, the management of the reaction container 213 and the dispensing tip 215 on the preliminary storage portion 218 is described with reference to a flow chart of FIG. 6.

In a case where the user consistently replaces the consumable storage container 216 during the suspension of measurement operation with the reaction containers 213 and the dispensing tips 215 loaded on the preliminary storage portion 218, there is fear that the reaction containers 213 and the dispensing tips 215 on the preliminary storage portion 218 may be left unused for a long period of time. The consumables left unused for long periods may entail the following problem. In a case where the user, passing over the preliminary storage portion 218, seeks access to a unit on a rear side from the preliminary storage portion 218 for maintenance purpose, the user may inadvertently come in contact with the preliminary storage portion 218, causing some inhibitor of immune reaction or other reaction necessary for measurement to adhere to the consumables. Therefore, the apparatus is desirably configured to serve the purpose of preventing the reaction containers 213 and the dispensing tips 215 on the preliminary storage portion 218 from being left unused for long periods because of the consumable storage container 216 not replaced during the measurement operation. That is, when a predetermined length of time has passed from the loading of the reaction containers 213 and the dispensing tips 215 on the preliminary storage portion 218, the transport mechanism 219 is programmed to supply a reaction container 213 and a dispensing tip 215 on the preliminary storage portion 218 to the incubator disc 205 and the dispensing tip mounting position 220 even though the consumable storage container 216 is not replaced during the measurement operation.

When the measurement operation is started (S601), the control portion 222 determines in each apparatus operation cycle how much time has passed from the loading of the reaction containers 213 and the dispensing tips 215 on the preliminary storage portion 218 (S602).

When a predetermined length of time X has passed, the transport mechanism 219 stops the consumable supply from the consumable storage container 216 to the incubator disc 205 and the dispensing tip mounting position 220, and changes the consumable supply source so as to supply the consumables from the preliminary storage portion 218 to the incubator disc 205 and the dispensing tip mounting position 220 (S605, S606). In each apparatus operation cycle, the control portion 222 checks the number of remaining consumables on the preliminary storage portion 218 (S607).

If it is determined that some consumables remain, the control portion returns to the step S605 to continue the consumable supply till the preliminary storage portion 216 is emptied. If all the consumables on the preliminary storage portion 216 are consumed, the transport mechanism 219 transports the reaction container 213 and the dispensing tip 215 from the consumable storage container 216 to the incubator disc 205 and the dispensing tip mounting position 220 at the predetermined timing A in the same apparatus operation cycle (S608, S609). Further, the transport mechanism 219 transports the reaction container 213 and the dispensing tip 215 from the consumable storage container 216 to the preliminary storage portion 218 at the timing B when the operations of the steps S608 and S609 are not performed (S610, S611).

Further, in a case where the transport mechanism is not scheduled to transport the consumables to the incubator disc 205 and the dispensing tip mounting position 220 at the timing A, the transport mechanism 219 performs the operations of the steps S610 and S611 even at the timing A. These operations of the steps S608 to S611 are performed in the same apparatus operation cycle.

In each apparatus operation cycle, the control portion 222 checks for the loaded state of the preliminary storage portion 218 (S612), and repeats the operations of the steps S608 to S612 till a predetermined amount of reaction containers 213 and dispensing tips 215 are loaded on the preliminary storage portion 218.

Figure 6:
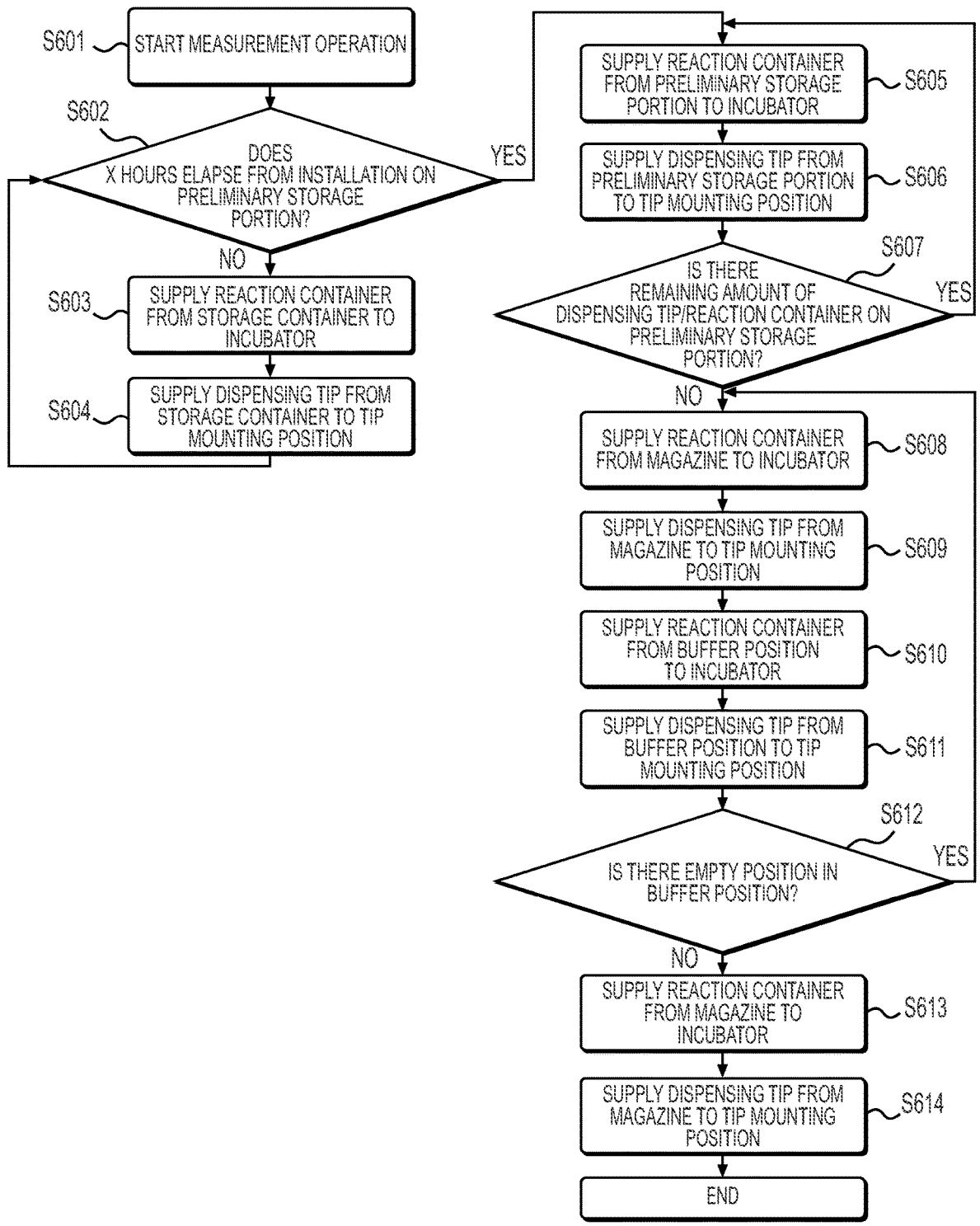
FIG. 6 is a flow chart illustrating time management of a reaction container and a dispensing tip on a preliminary storage portion illustrated in Example 1.

While FIG. 6 shows the operation flow where the operation is switched based on one set time X, the operation flow may have a plurality of set times. For example, a set time X1 may be used as a parameter to start the use of consumables from the preliminary storage portion 218, while a set time X2 may be used as a parameter to discard the consumables from the preliminary storage portion 218 but not to use them. This permits the reaction containers 213 and the dispensing tips 215 loaded on the preliminary storage portion 216 to be automatically renewed on a periodic basis. This results in a reduced risk that reexamination is required due to unexpected contamination.

According to the first embodiment, as described above, the consumables are supplied to the preliminary storage portion 218 when the user makes the request for replacing the consumable storage container 216. Since the first embodiment permits the user to replace the consumable storage container 216 before the reaction containers 213 and the dispensing tips 215 on the consumable storage container 216 are consumed, the user need not defer the consumable replacement till the consumable storage container 216 is emptied. The consumables can be supplied at an opportune time for the user. Further, the embodiment negates the need for providing a special mechanism for the replacement of the consumable storage container 216. The embodiment uses a simple structure to enable the replacement of the consumable storage container 216 even during the measurement operation and without stopping the measurement operation. The embodiment can achieve the reduction of risk of delay in reporting the test result due to the consumable shortage.

Second Embodiment

Next, a second embodiment as a modification of the first embodiment is described. According to the second embodiment, the apparatus automatically supplies the consumables to the preliminary storage portion 218 at predetermined times e.g., during the preparation operation before the start of measurement operation and during the measurement operation. When the user makes request for replacing the consumable storage container 216 during the measurement operation, the apparatus immediately changes the supply source from the consumable storage container 216 to the preliminary storage portion 218 so as to enable the user to replace the consumable storage container 216. The timing to supply the consumables to the preliminary storage portion 218 is during the preparation operation before the start of measurement operation, immediately after the start of measurement operation or immediately after completion of replacement of the consumable storage container 216 by the user.

FIG. 7 shows an operation flow of a case where the consumables are supplied to the preliminary storage portion 218 during the preparation operation before the start of measurement operation.

When receiving a measurement request (S701), the automated analyzer 201 starts the premeasurement preparation operation (S702). The apparatus checks for the loaded state of the preliminary storage portion 218 according to the method described in the first embodiment and determines whether or not there is any difference from the loaded state already stored in the storage device (S703, S704). If there is some difference, the apparatus discards all the reaction containers and dispensing tips on the preliminary storage portion (S705).

Next, the apparatus checks whether there is any vacant position in the preliminary storage portion (S706). If there is some vacant position, the transport mechanism 219 transports the consumable item from the consumable storage container 216 to the preliminary storage portion 218 and repeats the operation till all the positions are loaded (S707, S708). When all the positions are loaded, the consumable transport unit 208 terminates the premeasurement preparation operation (S709). When the premeasurement preparation operations of the other units are completed, the apparatus proceeds to an operation flow of FIG. 8 showing the measurement operation. The transport mechanism 219 performs the measurement operation according to the normal operation flow shown in FIG. 3.

Next, description is made on an operation flow of FIG. 8 of a case where the consumables are supplied to the preliminary storage portion 218 after the start of measurement operation.

When receiving a measurement request (S801), the automated analyzer starts the premeasurement preparation operation (S802). The consumable transport unit 208 checks for the loaded state of the preliminary storage portion 218 according to the method described in the first embodiment (S804). If there is some difference in the loaded state, the apparatus discards all the consumables at all the positions on the preliminary storage portion 218 (S805). The apparatus completes the measurement preparation operation (S806) and proceeds to the measurement operation (S807). If the loaded state matches the state stored in the storage device 225, the apparatus terminates the premeasurement preparation operation (S806). After the premeasurement preparation operations of the other units are completed, the apparatus proceeds to the measurement operation (S807).

When the measurement operation is started, the transport mechanism 219 supplies the consumables from the consumable storage container 216 to the incubator disc 205 and the tip mounting position 220 (S808, S809).

If the loaded state is checked in the step S803 to determine that there are some vacant positions, or if the loaded state is checked against the stored state in the step S804 to determine that the actual loaded state differs from the loaded state stored in memory and hence, the reaction containers and the dispensing tips at all the positions are discarded, the consumables are supplied to the vacant positions of the preliminary storage portion 218 in the same operation cycle of the consumable supply to the incubator disc 205 and the tip mounting position 220 (S811, S812). The transport mechanism 219 transports the consumables to the incubator disc 205 and the dispensing tip mounting position 220 at the predetermined timing A in the same apparatus operation cycle (S808, S809), and transports the consumables to the preliminary storage portion 218 at the timing B when the above operations are not performed (S811, S812). In a case where the mechanism is not scheduled to transport the consumables at the timing A, the transport mechanism transports the consumables to the preliminary storage portion even at the timing A. Till all the positions of the preliminary storage portion 218 are loaded, the supply to the incubator disc 205 and the tip mounting position 220 is performed in parallel to the supply to the preliminary storage portion 218. When the supply to the preliminary storage portion 218 is completed, the transport mechanism 219 continues the measurement operation according to the normal operation flow shown in FIG. 3 (S813).

Next, FIG. 9 shows an operation flow of supplying the consumables to the preliminary storage portion 218 in a case where the consumable storage container 216 is replaced by the user during the measurement operation.

The flow of operations from the premeasurement preparation operation to the replacement of the consumable storage container 216 by the user conforms to the first embodiment and the flow charts of FIG. 4-1 to FIG. 4-2 and hence, a detailed description thereof is dispensed with.

When the user completes the operation of replacing the consumable storage container 216, the transport mechanism 219 supplies the consumables to the incubator disc 205 and the tip mounting position 220 (S901, S902), and also supplies the consumables to the vacant positions of the preliminary storage portion 218 during the same operation cycle (S903, S904). It is noted that the transport mechanism 219 performs the operations of the steps S901 and S902 at the predetermined timing A in the same apparatus operation cycle, while performing the operations of the steps S903 and S904 at the timing B when the above steps are not performed. Further, in the case where the transport mechanism is not scheduled to supply the consumables at the timing A, the transport mechanism performs the steps S903 and S904 even at the timing A. The supply to the incubator disc 205 and the tip mounting position 220 is performed in parallel to the supply to the preliminary storage portion 218 till all the positions of the preliminary storage portion 218 are loaded.

The apparatus determines whether or not the consumables are supplied to all the vacant positions of the preliminary storage portion 218 (S905). If it is determined that there is no vacant position on preliminary storage portion 218, the apparatus proceeds to the normal operation flow shown in FIG. 3 to continue the measurement operation. On the other hand, if it is determined that some vacant positions still remain, the apparatus returns to the step S901 to continue the consumable supply to the preliminary storage portion.

In this embodiment, the example where the timing to start loading the reaction container 213 and the dispensing tip 215 from the consumable storage container 216 to the preliminary storage portion 218 is changed has been described as the modification of the first embodiment. The details other than the timing to start loading the reaction container 213 and the dispensing tip 215 from the consumable storage container 216 to the preliminary storage portion 218 conform to the first embodiment.

In this embodiment, the preliminary storage portion 218 is previously loaded with the reaction containers 213 and the dispensing tips 215. In addition to the effects of the first embodiment, therefore, this embodiment has an advantage in negating the need for the user to wait for the preparation operation for the replacement of the consumables and saving time taken for the replacement of consumables.

Third Embodiment

As for a third embodiment, description is made on an operation flow of a case where all the consumables retained on the consumable storage container 216 are consistently supplied to the incubator disc 205 and the tip mounting position 220 via the preliminary storage portion 218. It is noted that the preliminary storage portion 218 of this embodiment is desirably configured to be loaded with more reaction containers 213 and dispensing tips 215 than the preliminary storage portions 218 of the first and second embodiments.

A normal operation flow of the transport mechanism 219 of the third embodiment is shown in FIG. 10. It is noted that the description of the steps common to those of the operation flow of FIG. 3 is dispensed with.

When the measurement operation is started, the transport mechanism 219 grasps an unused reaction container 213 or dispensing tip 215 on the consumable storage container 216 so as to supply it to the preliminary storage portion 216 (S1001 to S1009). In steps S1010 to S1016, the transport mechanism 219 repeats an operation to supply the consumables to the preliminary storage portion 216.

Subsequently, the transport mechanism 219 grasps the consumable item on the preliminary storage portion 216, supplying the consumable item to the incubator disc 205 or to the tip mounting position 220 and performs an analytic operation (S1017 to S10024). The used reaction container 218 on the incubator disc 205 as finished with the analytic operation is transported to the discarding hole 221 and discarded by the transport mechanism 219 (S1025 to S1029). If the next measurement is scheduled, the transport mechanism returns to the step S1001 to repeat again the operation flow from the consumable transport from the consumable storage container 216 to the preliminary storage portion 216.

The operations of the steps S1001 to S1029 are all performed in the same operation cycle. While the embodiment is described by way of a case where the consumable supply from the consumable storage container 216 to the preliminary storage portion 218 is repeated twice in one operation cycle, the consumable supply may also be performed three times or more in the same operation cycle. Since the consumable supply from the consumable storage container 216 to the preliminary storage portion 218 is performed multiple times in the same operation cycle, the number of the reaction containers 213 and dispensing tips 215 supplied from the consumable storage container 216 becomes larger than the number of the reaction containers 213 and dispensing tips 215 supplied from the preliminary storage portion 218. Therefore, the number of the reaction containers 213 and dispensing tips 215 on the preliminary storage portion 218 keeps increasing.

According to the embodiment, the number of loadable consumables on the preliminary storage portion 218 is larger than that of the first embodiment or the second embodiment. Therefore, if the consumables on the consumable storage container 216 are consumed, the reaction containers 213 and the dispensing tips 215 on the preliminary storage portion 218 can be used to continue the measurement operation for long hours. This permits the user to defer the consumable replacement till the consumable storage container 216 is emptied so that occasions to discard unused reaction containers 213 and dispensing tips 215 can be reduced.

Figures 3, 11:
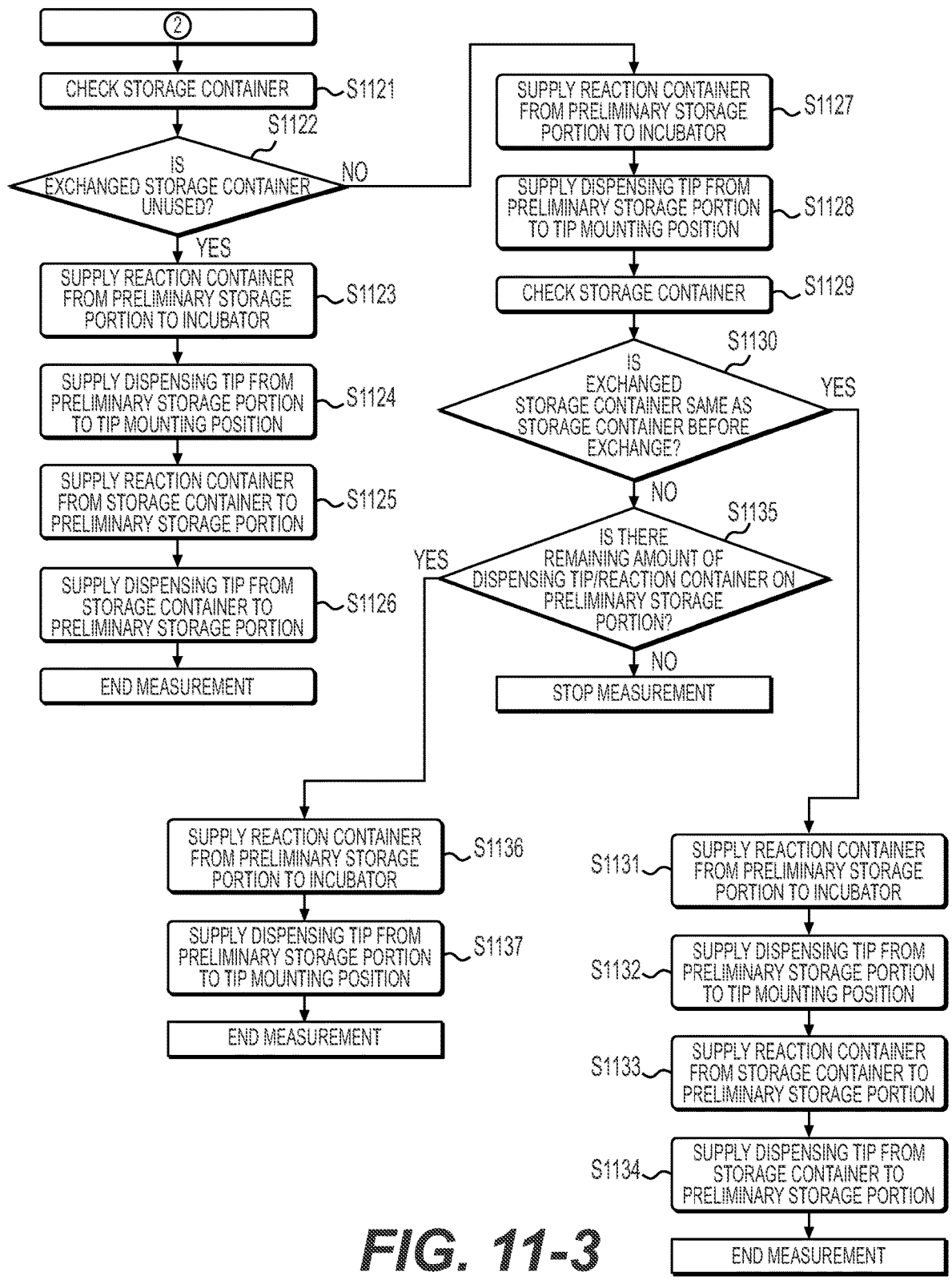

Next, an operation flow of a case where a request for replacing the consumable storage container 216 is made by the user is shown in FIG. 11.

When receiving a measurement request from the user (S1101), the automated analyzer 201 starts premeasurement preparation operations of the individual units (S1102). During the premeasurement preparation operations, the apparatus performs reset operations of the individual mechanism portions and operations of changing the system water in the syringes and the flow paths connected to the sample dispensing mechanism 206 and the and reagent dispensing mechanism 207. At this time, the consumable transport unit 208 uses the transport mechanism 219 to check the preliminary storage portion 218 for the state loaded with the consumables (S1103). The transport mechanism 219 determines the loaded state by performing the grasping operation at each of the positions on the preliminary storage portion 218. In this operation, the transport mechanism may check the loaded state at all the positions on the preliminary storage portion 218 or otherwise, may check at the plural predetermined positions. Alternatively, a camera may be disposed at place above the preliminary storage portion 218 so as to determine the presence or absence of the consumable item based on the image analysis. Further, the distance measuring device such as a laser displacement meter may be mounted to the transport mechanism 219 so as to determine the presence or absence of the consumable item based on the measurement of distance between the transport mechanism 219 and the preliminary storage portion 218.

The storage device 225 stores the loaded state of the preliminary storage portion 218 at the completion of the previous measurement work. The storage device 225 compares the loaded state stored therein and the actual loaded state determined by the transport mechanism 219 so as to determine whether or not there is any difference therebetween (S1104). If there is no change in the loaded state, the apparatus terminates the premeasurement preparation operation of the consumable transport unit 208. On the other hand, if the loaded state is changed, the apparatus determines that the loaded state is manipulated by the user and discards all the consumables on the preliminary storage portion 218 (S1105).

When the premeasurement preparation operations of the consumable transport unit 208 and the other units are completed, the automated analyzer 201 starts the measurement operation (S1106). The consumable transport unit 208 performs the normal operation shown in FIG. 10 till the user expresses an intention to replace the consumable storage container 216 by means of the operation portion 223, the fixed button or the like (S1107 to S1110).

In each operation cycle, the control portion 222 checks whether the request for replacement of the consumable storage container is made by the user (S1111). If the replacement request is made, the apparatus proceeds to an operation flowchart shown in FIG. 11-2. If the request is not made, the apparatus repeats the operations of the steps S1107 to S1111.

Recognizing that the replacement request is made by the operator, the transport mechanism 219 stops the consumable supply from the consumable storage container 216 to the preliminary storage portion 218 and switches to the consumable supply from the preliminary storage portion 218 (S1112, S1113). The control portion 222 unlocks the storage container holding portion 217 (S1114) and notifies the operation portion 223 that the replacement of the consumable storage container 216 is enabled (S1115). Any methods are usable to make the notification.

Subsequently, the transport mechanism 219 continues to supply the consumables from the preliminary storage portion 218 till the access to the storage container holding portion 217 by the operator is detected (S1116, S1117). When the access by the operator is detected, the transport mechanism proceeds to an operation flow shown in FIG. 11-3. The replacement end signal sent from the user manipulating the operation portion 223 or the fixed button may be used as a trigger to proceed to the operation shown in FIG. 11-3.

On the other hand, if the access to the storage container holding portion is not detected, the number of remaining reaction containers 213 and the number of remaining dispensing tips 215 on the preliminary storage portion 218 are determined (S1119). If some consumables remain, the operations of the steps S1116 to S1119 are repeated. If it is determined in the step S1119 that no consumable item remains, a new measurement operation is suspended. It is noted that the operations of the steps S1116 to S1119 are performed in the same apparatus operation cycle.

According to the operation flow of FIG. 11-3, the transport mechanism 219 checks whether the consumable storage container 216 retained on the storage container holding portion 217 is unused or not (S1121) because the consumable storage container 216 may possibly be replaced with a new one by the access to the storage container holding portion 217. Incidentally, the step S1121 is performed at the vacant time in the apparatus operation cycle and in parallel to the consumable supply from the preliminary storage portion 218. Therefore, the measurement operation is not interrupted by the operation of the step S1121.

The transport mechanism 219 determines whether the consumable storage container 216 is unused or not by performing the grasping operation at the plural predetermined positions on the consumable storage container 216. Alternatively, a camera may be disposed at place above the consumable storage container 216 so as to determine the presence or absence of the consumable item based on the image analysis. Further, the distance measuring device such as the laser displacement meter may be mounted to the transport mechanism 219 so as to determine the presence or absence of the consumable item based on the measurement of distance between the transport mechanism 219 and the consumable storage container 216.

Whether the replaced consumable storage container 216 is unused or not is determined based on the check result of the step S1121 (S1122). If the relevant consumable storage container is determined as unused, the transport mechanism 219 performs the normal supply operation from the step S1123 to the step S1126 illustrated in FIG. 10.

On the other hand, if the consumable storage container replaced in the step S1122 is not determined as unused, the transport mechanism chooses the consumables on the preliminary storage portion 218 so as to continue the supply to the incubator disc 205 and the dispensing tip mounting position 220 (S1127, S1128). The transport mechanism 219 checks the replaced consumable storage container 216 in each apparatus operation cycle (S1129). The transport mechanism checks for the loaded state of the consumable storage container 216 at positions thereon other than the positions checked in the step S1121 so as to check whether or not the relevant consumable storage container 216 is used before the replacement operation (S1130). At this time, the check result of the step S1122 is also usable.

If it is determined that the set consumable storage container 216 is the same consumable storage container 216 that was used before the replacement operation, the transport mechanism performs the normal supply operation described with reference to FIG. 10 (S1131 to S1134).

On the other hand, if it is determined that the set consumable storage container 216 is a used consumable storage container that is different from the consumable storage container 216 used before the replacement operation, the number of remaining consumables on the preliminary storage portion 218 is determined in the step S1130 (S1135). If some consumables remain, the consumables are supplied from the preliminary storage portion 218 (S1136, S1137). On the other hand, if it is determined in the step S1135 that no consumable item remains, a new measurement operation is suspended.

According to the embodiment, the consumables are consistently retained on the preliminary storage portion 218 so that the operator can replace the consumable storage container 216 whenever the operator wants to replace the consumable storage container.

CLAIMS

201 automated analyzer
202 sample rack
203 rack transport line
204 reagent cooling unit
205 incubator disc
206 sample dispensing mechanism
207 reagent dispensing mechanism
208 consumable transport unit 209 detection portion unit
210 sample container
211 reagent container
212 reagent disc cover
213 reaction container
214 reaction container disposition portion
215 dispensing tip
216 consumable storage container
217 storage container holding portion
218 preliminary storage portion
219 transport mechanism
220 tip mounting position
221 discarding hole
222 control portion
223 operation portion
224 control device
225 storage device

The invention claimed is:

1. An automatic analytic apparatus comprising:
a processing unit configured to perform processing for sample analysis;
a consumable supply unit that includes: a consumable container holding portion for holding a consumable storage container where consumables including reaction containers or dispensing tips are arranged and accommodated;
a preliminary storage portion for temporarily storing the consumables taken out from the consumable storage container;
a transport mechanism for transporting the consumables to the processing unit;
a lock mechanism that restricts an operator's access to the consumable container holding portion; and
a controller configured to:
control the operations of the processing unit, the consumable supply unit and the lock mechanism,
control the transport mechanism so that the transport mechanism transports at least some of the consumables taken out from the consumable storage container to the preliminary storage portion for storage, and
when a request for replacing the consumable storage container is received from an operator, control to change a supply source of consumables transported by the transport mechanism from the consumable storage container to the preliminary storage portion and subsequently control to unlock the lock mechanism.

2. The automatic analytic apparatus according to claim 1, wherein
when the request for replacing the consumable storage container is received from the operator, the transport mechanism supplies consumables to the preliminary storage portion.

3. The automatic analytic apparatus according to claim 1, wherein
the request for replacement is made by input through an operation portion or input through a fixed button.

4. The automatic analytic apparatus according to claim 1, wherein
the transport mechanism performs the delivery of consumables to the processing unit and the delivery of consumables to the preliminary storage portion in a same processing cycle.

5. The automatic analytic apparatus according to claim 1, further comprising a monitoring portion that monitors whether or not an access to the consumable container holding portion is received from the operator, wherein
when the monitoring portion detects the access to the consumable container holding portion, the controller is configured to control to perform an operation of determining whether or not a consumable storage container set anew on the consumable container holding portion is unused.

6. The automatic analytic apparatus according to claim 1, wherein the controller is further configured to:
check for a loaded state of the preliminary storage portion at a timing of performing a premeasurement preparation operation; and
if the check result of the loaded state differs from a loaded state stored in the apparatus, perform control to cause all the consumables stored in the preliminary storage portion to be discarded.

7. The automatic analytic apparatus according to claim 1, wherein
if the preliminary storage portion has some vacant positions, the transport mechanism supplies consumables to the preliminary storage portion during a preparation operation before start of measurement work or during a measurement operation.

8. The automatic analytic apparatus according to claim 1, wherein
the transport mechanism commits a consumable item supplied from the consumable supply unit to storage in the preliminary storage portion once and then, supplies the consumable item to the processing unit.

9. The automatic analytic apparatus according to claim 8, wherein
the transport mechanism performs a consumable supply operation to the preliminary storage portion more than once in a same processing cycle.

10. The automatic analytic apparatus according to claim 1, wherein the controller is further configured to:
manage time elapsed after the consumables were set on the preliminary storage portion and preferentially perform control to use the consumables on the preliminary storage portion after a lapse of a predetermined length of time.

11. The automatic analytic apparatus according to claim 1, wherein the controller is further configured to:
manage time elapsed after the consumables were set on the preliminary storage portion and perform control to cause the consumables to be discarded after a lapse of a predetermined length of time.

* * * * *